(12) United States Patent
Sharnagat et al.

(10) Patent No.: US 11,609,841 B2
(45) Date of Patent: Mar. 21, 2023

(54) SYSTEMS AND METHODS FOR TESTING MODELS

(71) Applicant: Walmart Apollo, LLC, Bentonville, AR (US)

(72) Inventors: Rahul D. Sharnagat, Sunnyvale, CA (US); Sreenivasa Prasad Sista, Cupertino, CA (US); Min Xie, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 161 days.

(21) Appl. No.: 17/163,377

(22) Filed: Jan. 30, 2021

(65) Prior Publication Data

US 2022/0245058 A1 Aug. 4, 2022

(51) Int. Cl.
*G06F 11/36* (2006.01)

(52) U.S. Cl.
CPC ...... *G06F 11/3684* (2013.01); *G06F 11/3608* (2013.01)

(58) Field of Classification Search
CPC .......... G06F 11/3608; G06F 11/3684
See application file for complete search history.

(56) References Cited

U.S. PATENT DOCUMENTS

| 8,166,458 | B2 * | 4/2012 | Li | G06F 11/3696 717/124 |
| 11,151,020 | B1 * | 10/2021 | Bajoria | G06F 9/54 |
| 2010/0095276 | A1 * | 4/2010 | Ottavi | G06F 11/3672 717/125 |
| 2017/0242784 | A1 | 8/2017 | Heorhiadi et al. | |
| 2022/0100644 | A1 * | 3/2022 | Tiwari | G06F 11/3604 |
| 2022/0100645 | A1 * | 3/2022 | Paterson-Jones | G06F 9/45558 |

OTHER PUBLICATIONS

Naini, "11 Best Tools to Test and Build API Faster", 2020, p. 1-13.
Nair, "Open Source Testing forMicroservices", 2018, p. 1-7.

* cited by examiner

*Primary Examiner* — S. Sough
*Assistant Examiner* — Stephen D Berman
(74) *Attorney, Agent, or Firm* — Morgan, Lewis & Bockius LLP; Manita Rawat

(57) ABSTRACT

This application relates to systems and methods for automatically generating experiments based on experiment requests routed to micro-services (model sub-components) using a prefix-based routing mechanism. In some examples, experiment requests may parsed to determine lower layer services (e.g., components) whose properties need to be changed for a model iteration. Prefixes in requests may be used to route the experiment requests and portions thereof to appropriate services or layers for configuration at the micro-service level. Routing tables at each higher layer may be utilized to determine the correct sub-layers to redirect a request and/or portion thereof. At micro-service level, each micro-service may store and use a configuration table to match a received parameter in a request with a property and its corresponding value for the experiment.

18 Claims, 7 Drawing Sheets

| CONFIGURATION TABLE 302 | | |
|---|---|---|
| Configuration Parameters 510 | Properties 520 | Values 530 |
| PT101 (511) | pt.primary (521) | 101 (531) |
| OCWL (512) | whitelistQC (522) | on (532) |
| PT111 (513) | pt.primary (523) | 111 (533) |

| GLOBAL PARAMETERS TABLE 540 | |
|---|---|
| Properties 550 | Global Value 560 |
| pt.primary (551) | 100 (561) |
| st.primary (552) | 500 (562) |
| qc.primary (553) | 400 (563) |

FIG. 5

SYSTEMS AND METHODS FOR TESTING MODELS

TECHNICAL FIELD

The disclosure relates generally to testing models and, more specifically, to systems and methods for testing iterations of model in streamlined manner.

BACKGROUND

With the advent of artificial intelligence in real-world application, the results of the artificial algorithms affect users' lives in a variety of different ways. For example, algorithms (e.g., multi-level models, software components) are increasingly used to predict user behavior and interests which is ultimately used to provide different recommendations, news articles, etc. to different users. Such models are generated in various iterations with each iteration configured using different parameters. A model may include several layers (e.g., components, sub-components, front end, middle layer, micro-services), each layer may itself include one or more models with features or parameters. The user (e.g., creator) of the model may generally test different iterations of the model with different combinations of parameters (e.g., properties) of different sub-models to determine various performance metrics. The final model deployed may be determined based on the testing metrics of each iteration. To test an iteration of a model, a new code must be written and passed through the system to change value of each parameter of each sub-model that is to be tested. For example, to test a value of parameter in a third layer sub-model, switches must be coded for each upper layer (e.g., first and second layers) before being able to test the performance of the model using the test value for the parameter in the third layer sub-model. This requires a large amount of time and resources every time an iteration needs to be tested. Further, manual coding required for each iterations may also be prone to human error.

SUMMARY

The embodiments described herein are directed to testing a model (e.g., algorithm, software stack) based on a received experiment. The embodiments may generate an experimental model based on receiving an experiment request without requiring code change at multiple layers of a base model. The experiment request may include one or more prefixes for one or more layers of the model. A prefix of the request may be analyzed to determine a layer prefix(es) and a payload for the next layer(s). The payload may be transmitted to an associated layer based on the layer prefix. In some examples, all possible layers, their corresponding routing addresses (e.g., routing instructions) and their corresponding prefixes may be maintained in a database associated with each layer and sub-layer, such that the prefix in the experiment request may be compared to the prefixes in the database to determine the layer to transmit the request. The payload may then be analyzed at the requested layer to determine a property and a corresponding requested value. A configuration table may then be used to determine a key to generate the test model based on the property and the requested value. The test model may be generated by switching a global value of a property to the requested value. The test model may then be used to collect test metrics.

In accordance with various embodiments, exemplary systems may be implemented in any suitable hardware or hardware and software, such as in any suitable computing device. For example, in some embodiments, a computing device is configured to receive an experiment request. The experiment request includes a prefix of pre-determined length. The computing device may be further configured to determine a first service based, at least in part, on the prefix. The computing device is further configured to transmit a portion of the experiment request to the first service. Also, the computing device is configured to analyze, at the first service, the portion of the experiment request to determine a plurality of pairs of sub-prefixes and configuration parameters. Each pair includes a corresponding sub-prefix and a corresponding configuration parameter. The computing device is also configured to transmit each configuration parameter to a second service of a plurality of second services such that each configuration parameter is transmitted to a different second service based on the sub-prefix of the corresponding pair. Further, the computing device is configured to generate an experiment by modifying the plurality of second services based at least in part on the corresponding configuration parameters.

In some embodiments, a method is provided that includes receiving an experiment request. The experiment request includes a prefix of pre-determined length. The method includes determining a first service based, at least in part, on the prefix. The method also includes transmitting a portion of the experiment request to the first service. Further, the method includes analyzing, at the first service, the portion of the experiment request to determine a plurality of pairs of sub-prefixes and configuration parameters. Each pair including a corresponding sub-prefix and a corresponding configuration parameter. The method also includes transmitting each configuration parameter to a second service of a plurality of second services such that each configuration parameter is transmitted to a different second service based on the sub-prefix of the corresponding pair. Further, the method includes generating an experiment by modifying the plurality of second services based at least in part on the corresponding configuration parameters.

In yet other embodiments, a non-transitory computer readable medium has instructions stored thereon, where the instructions, when executed by at least one processor, cause a computing device to perform operations that include receiving an experiment request. The experiment request includes a prefix of pre-determined length. The instructions, when executed by the at least one processor further cause the computing device to perform operations that include determining a first service based, at least in part, on the prefix. The instructions, when executed by the at least one processor further cause the computing device to perform operations that include transmitting a portion of the experiment request to the first service. Further, the instructions, when executed by the at least one processor further cause the computing device to perform operations that include analyzing, at the first service, the portion of the experiment request to determine a plurality of pairs of sub-prefixes and configuration parameters. Each pair includes a corresponding sub-prefix and a corresponding configuration parameter. The instructions, when executed by the at least one processor further cause the computing device to perform operations that include transmitting each configuration parameter to a second service of a plurality of second services such that each configuration parameter is transmitted to a different second service based on the sub-prefix of the corresponding pair. Also, the instructions, when executed by the at least one processor further cause the computing device to perform operations that include includes generating an experiment by modifying the plurality of second services based at least in part on the corresponding configuration parameters.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 5 is an example illustration of a model configuration table in accordance with some embodiments;

DETAILED DESCRIPTION

Figure 1:
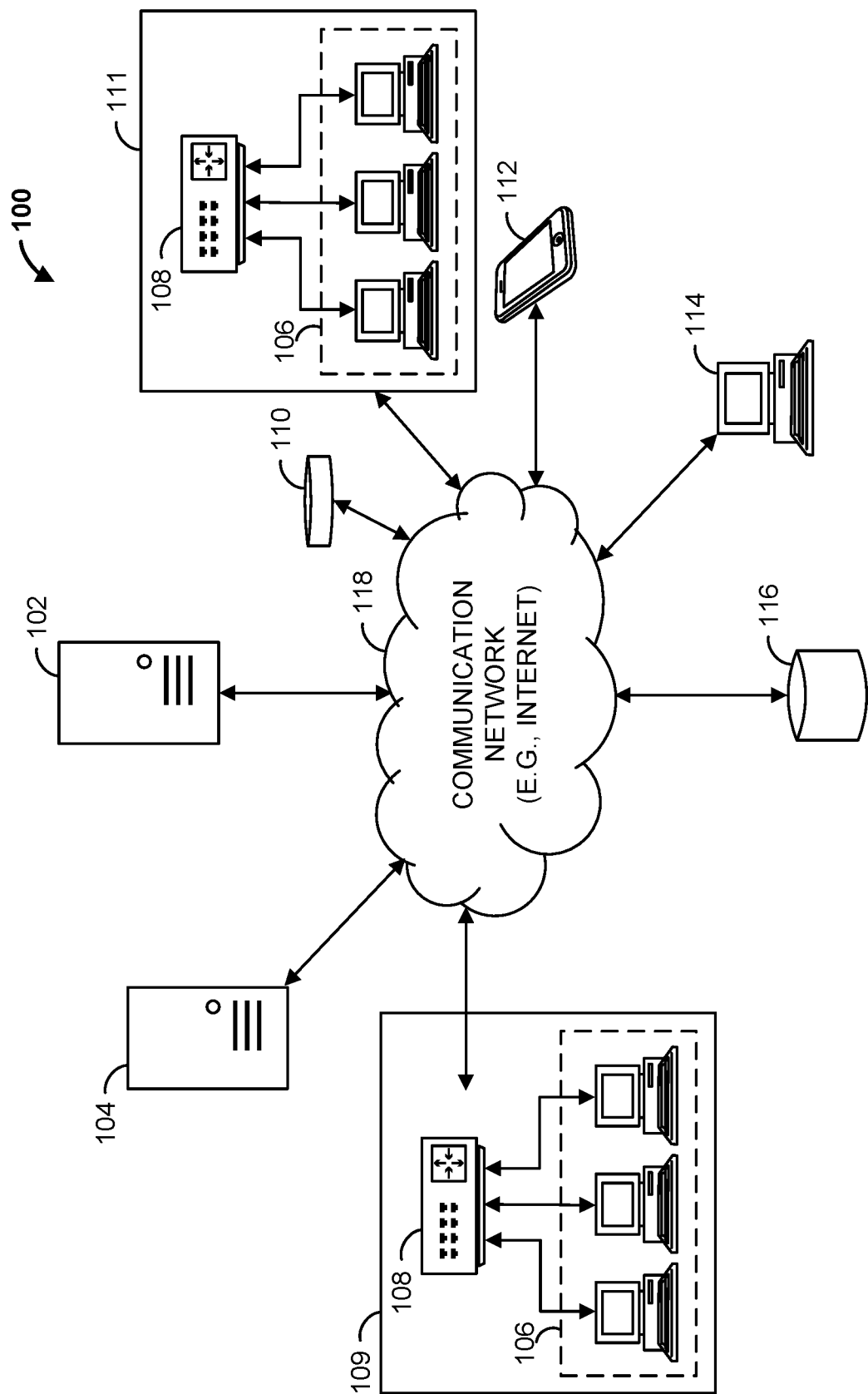
FIG. 1 is a block diagram of a model testing system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a model system 100 that includes a test generation computing device 102 (e.g., a server, such as an application server), a web server 104, workstation(s) 106, database 116, and multiple customer computing devices 110, 112, 114 operatively coupled over network 118. Test generation computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, test generation computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, test generation computing device 102 is operated by an entity training and deploying the models (e.g., machine learning models, algorithms, software stack) including multiple components at multiple layers, and multiple customer computing devices 112, 114 are operated by customers of the entity.

Although FIG. 1 illustrates three customer computing devices 110, 112, 114, model testing system 100 can include any number of customer computing devices 110, 112, 114. Similarly, model testing system 100 can include any number of workstation(s) 106, test generation computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with test generation computing device 102 over communication network 118. The workstation(s) 106 may send data to, and receive data from, test generation computing device 102. For example, the workstation(s) 106 may transmit data related to experiments to test generation computing device 102. In response, test generation computing device 102 may transmit an indication of one or more model performance metrics to the workstation(s) 106 in real-time.

In some examples, web server 104 may host one or more web pages, such as a retailer's or merchant's website, model testing page. Web server 104 may transmit data related to an experiment on the page by a user to test generation computing device 102. In response, test generation computing device 102 may transmit an indication of model performance metrics to display on the website or web page to the user. For example, the performance output (e.g., metrics) of the model may be displayed on a webpage, as graph, on a homepage, or on a webpage dedicated to a model when the user requests test of a specific iteration of the model.

First customer computing device 110, second customer computing device 112, and $N^{th}$ customer computing device 114 may communicate with web server 104 over communication network 118. For example, each of multiple computing devices 110, 112, 114 may be operable to view, access, and interact with webpages of a website hosted by web server 104. In some examples, web server 104 hosts a website for a retailer or merchant that allows for the testing of models (e.g., machine learning models, algorithms, software stacks, software components). For example, the website may list performance metrics of models and/or portions of the models. An operator of one of multiple computing devices 110, 112, 114 may access the website hosted by web server 104, add or change one or more parameters or properties of the model, and perform an experiments of the model iteration to determine performance of that model iteration.

Test generation computing device 102 is operable to communicate with database 116 over communication network 118. For example, test generation computing device 102 can store data to, and read data from, database 116. Database 116 can be a remote storage device, such as a cloud-based server, a memory device on another application server, a networked computer, or any other suitable remote storage. Although shown remote to test generation computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Test generation computing device 102 can generate a test model (i.e., model iteration) based on an experiment request. For example, test generation computing device may receive an experiment request from a user for testing an iteration of a model (e.g., neural network, convolutional neural network, deep neural network, machine learning model, algorithm, software stack, software component, etc.). The experiment request may include parameters for testing a model. Test generation computing device 102 may receive, at a front end service (e.g., front end server, front layer, first component), parameters for testing the model. The front end service may decode the parameters to a format compatible with a secondary service (e.g., search layer, second layer, search service, secondary component, sub-component). The parameters may be analyzed to determine service prefix and a corresponding payload. The service prefix(es) may be associated with a micro-service(s) (e.g., third layer, sub-model supporting the secondary service, sub-component of the secondary service). The parameter may include the service prefix followed by the first payload. For example, the parameter may include: <SERVICE_PREFIX><PAYLOAD>. Even though three layers (e.g., component levels) are discussed with regards to a model, it should be understood that any number of layers or component levels may be similarly present and routing of the experiment request may similarly be performed using multiple prefixes at various layers. It should also be understood that the model may include services (e.g., layers, components, sub-components) in a hierarchical tree structure.

In some examples, test generation computing device 102, via the front end service may transmit or redirect the first payload to the secondary service based on the service prefix. The first payload may include a front routing table including service prefixes corresponding to all secondary services, each service prefix associated with a secondary service (e.g., secondary service identifier). In some examples, the prefixes may further be associated in the front routing table with corresponding routing addresses or locations corresponding to the associated secondary service. Test generation computing device 102 may compare the received service prefix to all available service prefixes to determine the secondary service to route the first payload to. Front end service may then transmit or redirect the first payload to the matching secondary service for further analysis (e.g., redirection).

In some examples, the secondary service may analyze the first payload to determine one or more sub-prefixes and their corresponding one or more sub-payloads. The first payload may be configured in sequential sub-prefix-sub-payload pairs. In this way, a first sub-prefix may be followed by a corresponding first sub-payload, followed by a second sub-prefix, corresponding second sub-payload, and so on. In some examples, each pair may be separated using a separator, such as but not limited to a "_", "/", etc. For example, pairs may be as follows: <SUB_SERVICE_PREFIX1><PAYLOAD1><SEPARATOR><SUB_SERVICE_PREFIX2><PAYLOAD2> In some examples, the secondary service may store a secondary routing table associating each available micro-service with corresponding sub-prefix(es). Test generation computing device 102 may access the routing table to find the micro-service(s) to redirect the corresponding sub-payload(s) to for further analysis and/or experiment configuration. In some examples, the routing table may also associate the prefixes for the available micro-services to destination locations (e.g., addresses) for the corresponding micro-services. Test generation computing device 102, via the secondary service, may compare the sub-prefix(es) in the received first payload to the sub-prefixes in the routing table to determine the micro-service(s) to which the experiment request is directed to. The sub-payload(s) may then be transmitted and/or re-directed to corresponding micro-service(s) based on the received sub-prefix(es), each sub-payload transmitted to its corresponding micro-service based on the associated sub-prefix.

For example, for an experiment request PRPT101_GUEXP1, where PR may be the secondary service prefix for a secondary service, "Preso," and the first payload transmitted to the "Preso" may be "PRPT101_GUEXP1." Secondary service, "Preso" may then determine that the sub-service and sub-payload pairs as "PR"-"PT101" and "GU"-"EXP1." Secondary service, "Preso" may determine that "PR" sub-service prefix refers to sub-service, "Perceive," and the "GU" sub-service prefix refers to sub-service, "Guide." As such, secondary service, "Preso" may redirect the sub-payload "PT101" to the sub-service "Perceive" for configuration, and the sub-payload "EXP1" to sub-service "Guide."

In some examples, a sub-service(s) receives its corresponding sub-payload for experiment configuration. A sub-payload may include an experiment configuration parameter (e.g., hyper parameter, configuration name, experiment key) for configuring the micro-service for the experiment. The sub-service may include a configuration table that including a triple-pair association including configuration parameter, property and value. Each possible configuration parameter in the configuration table may be associate with a property of the sub-service and a value. Test generation computing device 102 may consult the configuration table to determine the property (e.g., hyper parameter) and the corresponding value for the experiment. If the configuration table includes the configuration parameter, test generation computing device 102 may pull the corresponding property value and switch a global value for that property to the property value associated with the configuration parameter. In some examples, sub-service may also include a global model configuration (e.g., local configuration) that defines global values (e.g., current values) of each property in the sub-service. The global value of the requested property may then be changed to the requested value.

In this way, test generation computing device 102 may switch values of properties for each sub-service based on the corresponding sub-payloads. Once each of the sub-services in the experiment request have been appropriately modified, a test model (e.g., experiment model) may be generated. The test model may include the base model (e.g., pre-existing model, default model) with the modified property values based on the experiment request. The test model may then be tested to determine the performance of the test model. In this way, no code needs to be changed at the higher layers of the model, and the experiment may be efficiently and automatically be set up without switches having be coded for each experiment or test, saving operation time and flexibility in testing. Further, test generation computing device 102 may efficiently and dynamically switch between test models (e.g., iterations), allowing dependence between micro-services (e.g., sub-components, components, layers) to be injected in an easy manner by changing values for parameters in multiple micro-services in the same experiment. The test models may further inherit model parameters and values for iterating over various hyper parameter changes. It should be understood that the front end service, secondary service, and the micro-services may be stored on a single processor or in a distributed environment. The routing tables at each layer may be stored within the layers, in database 116 or distributed databases. Even though the embodiments herein are described with respect to machine learning models, it should be understood that the process may be used to test other types of models and/or software sub-components in a destination service (e.g., end-user service) as long as the model/sub-component is identified by a type and identifier (e.g., prefix).

Figure 2:
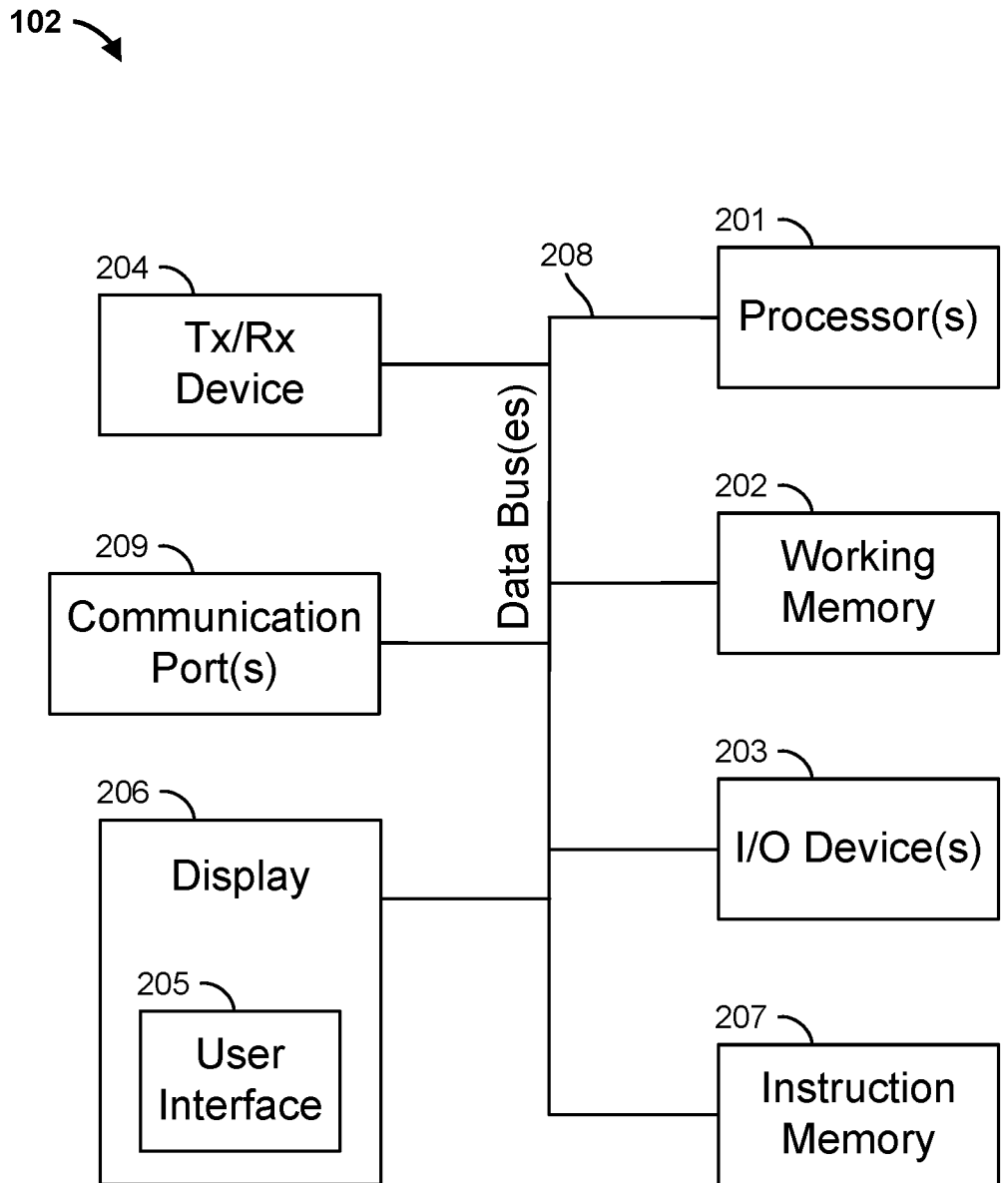
FIG. 2 is a block diagram of test generation computing device of model testing system of FIG. 1 in accordance with some embodiments.

FIG. 2 illustrates the test generation computing device 102 of FIG. 1. Test generation computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of test generation computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with test generation computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 and test generation computing device 102 will be operating in. Processor(s) 201 is operable to receive data from, or send data to, a network, such as communication network 118 of FIG. 1, via transceiver 204.

Figure 3:
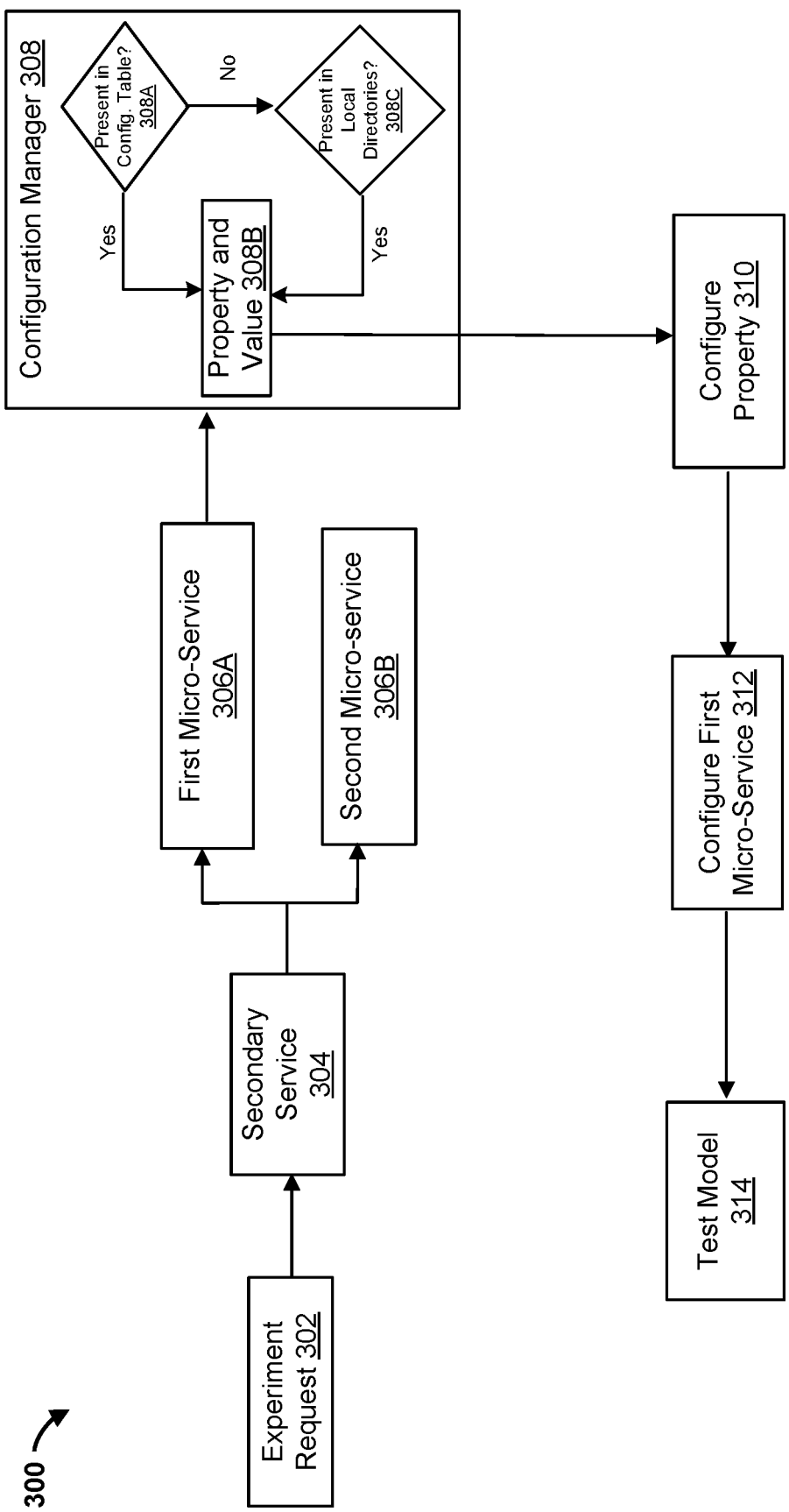
FIG. 3 is an example process flow illustrating a process of model testing system of FIG. 1 in accordance with some embodiments.

Turning now to FIG. 3, an example process flow 300 is shown. The process flow 300 illustrates how the model testing system 100 can generate a test model. The process 300 can begin when experiment request 302 is received or obtained by model testing system 100 from a user device. Such experiment request 302 can be received via a communications network, such as network 118. Experiment request 302 may be analyzed to determine a service prefix and a first payload followed by the service prefix. The service prefix in the experiment request 302 can be used to redirect the first payload to secondary service 304. For example, a routing table may be conferred to find secondary service 304 matching the service prefix. The routing table may also include a location and/or address of the sub-service 304 for the redirect.

Secondary service 304 may analyze the first payload to determine two sub-prefix and sub-payload pairs. Each pair may be separated by a separator, and each sub-prefix may be followed by a corresponding sub-payload. Secondary service 304 may redirect the sub-payloads to their corresponding micro-services, first micro-service 306A and second micro-service 306B, based on the sub-prefixes. For example, secondary service 304 may consult a routing table associating all sub-prefixes, associated with the secondary service, with corresponding micro-services. Secondary service 304 may redirect the sub-payloads to their corresponding micro-services, first micro-service 306A and second micro-service 306B for configuration.

First micro-service 306A and second micro-service 306B may then use their corresponding sub-payloads to configure the micro-services for generating test model 314. For example, first micro-service 306A may receive its corresponding sub-payload. The sub-payload may be used as a configuration parameter (e.g., configuration name, configuration key, experiment key). Micro-service 306A may use a configuration manager 308 to match the sub-payload to a configuration triple pair, associating the configuration parameter to a property and a property value for that property in a configuration table. Configuration manager 308 may determine whether the configuration parameter is present in the configuration table 308A. If the configuration parameter is present in the configuration table, configuration manager 308 may obtain the corresponding property and property value from the configuration table at step 308B. If the configuration parameter is not present in the configuration table, the process determines whether the configuration parameter is present in a local properties table that defines the global values for properties of the model at step 308C. The property and the property value may be determine from the local properties at step 308B if the configuration parameter is present in the local properties.

The property value from step 308B may then be used to configure the property (e.g., feature) at step 310. In some examples, a global value (e.g., current value, default value) of the property may be switched to the determined property value at step 310. The micro-service 306A may be configured for testing at step 312. Similarly, although not shown, micro-service 306B may be configured for testing based on its corresponding sub-payload. The test model 314 may then be generated based at least in part on the configured micro-services.

Figure 4:
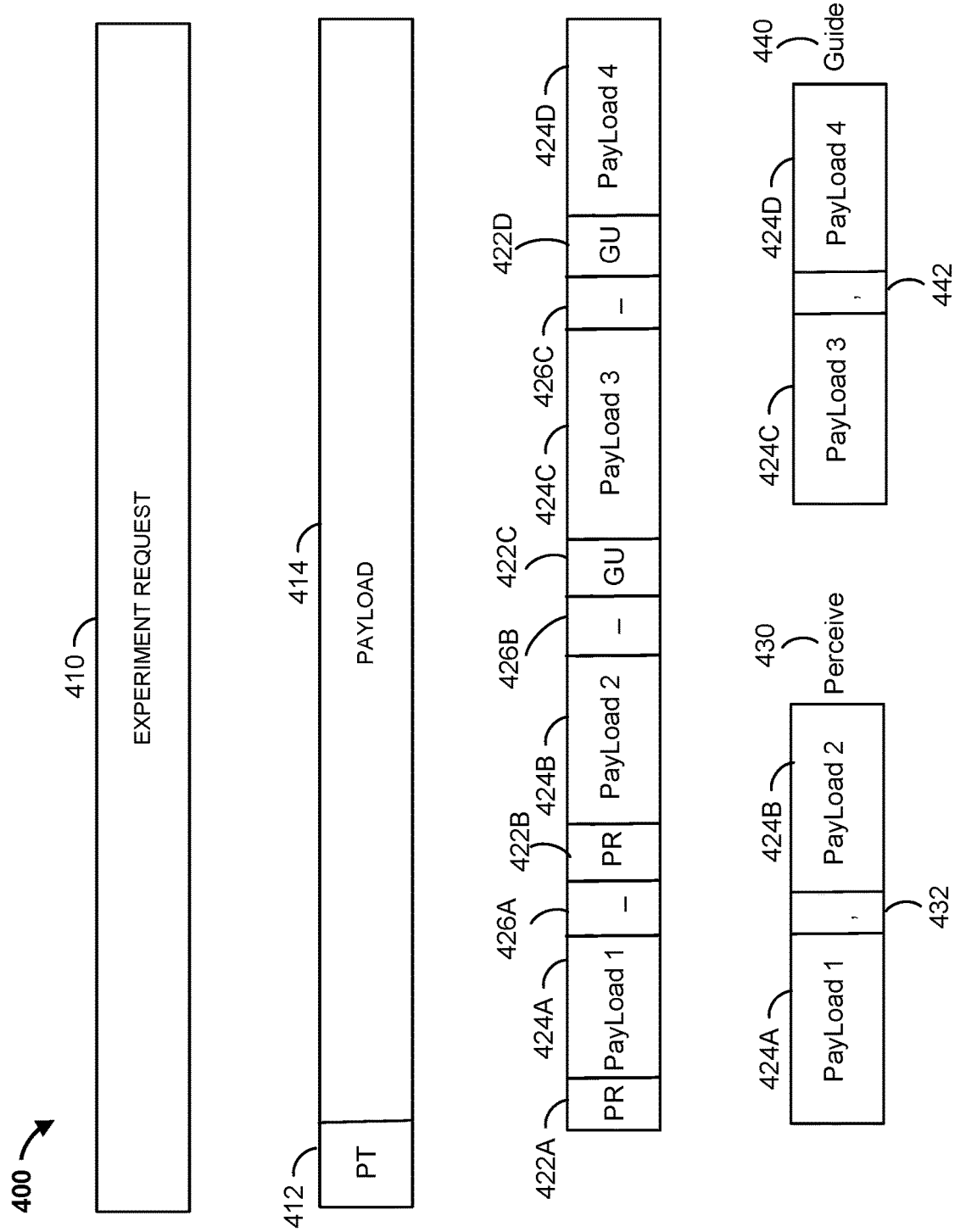
FIG. 4 is an example illustration of an experiment request analysis in accordance with some embodiments.

Referring now to FIG. 4, an example experiment request analysis 400 is illustrated. Front end service may receive an experiment request 410. The front end service may divide the experiment request 410 into a prefix 412 and payload 414. In some examples, the prefix 412 may be first predetermined number of characters in the experiment request. The prefix 412 may be compared by the front end service with a routing table associating secondary services in the layer below the front end service with corresponding prefixes (e.g., using the predetermine number of characters). The routing table may be stored on the front end service for easy and efficient retrieval. In other examples, the routing table may be stored in a separate database. The secondary service associated with the matching prefix as prefix 412 may be determined to be the secondary service. The characters after the prefix may be determined as the payload 414 to be transmitted or redirected to the secondary service associated with the prefix 412.

In some examples, experiment request 410 may include experiment requirements selected by a user. The front end service receives the selection in a format compatible with the front end service. Test generation computing device 102 may convert the user selections for the experiment to resemble the structure herein (i.e., prefix followed by payload, payload configured as sub-prefix and sub-payload pairs separated by separators).

Secondary service may receive from the front end service the payload 414. Secondary service may analyze the payload 414 to determine sub-prefix and sub-payload pairs. For example, secondary service 414 may divide payload 414 as sub-prefix 422A, sub-payload 424A, separator 426A, sub-prefix 422B, sub-payload 424B, sub-payload 426B, separator 426B, sub-prefix 422C, sub-payload 424C, separator 426C, sub-prefix 422D, and sub-payload 424D. The payload 414 may include the pairs in sequence. Secondary service may determine that the sub-prefix 422A and 422B are associated with micro-service 430, and sub-prefix 422C and 422D are associated with micro-service 440 based on a routing table storing the sub-prefixes for corresponding sub-services in the layer below the secondary service.

Accordingly, secondary service transmits sub-payload 424A and sub-payload 424B to micro-service 430 associated with sub-prefix 422A and sub-prefix 422B, respectively, as they are directed to the same micro-service because they are directed to the same micro-service as evidenced by both sub-prefix 422A and sub-prefix 422B including the same sub-prefix. The sub-payload 424A and 424B may be transmitted to micro-service 430 in a sequence separated by separator 432 for further processing or reconfiguring.

Similarly, secondary service transmits sub-payload 424C and sub-payload 424D to micro-service 440 associated with sub-prefix 422C and sub-prefix 422D, respectively, because they are directed to the same micro-service as evidenced by both sub-prefix 422C and sub-prefix 422D including the same sub-prefix. The sub-payload 424C and 424D may be transmitted to micro-service 440 in a sequence separated by separator 442 for further processing or reconfiguring. The reconfigured micro-service 430 and the reconfigured micro-service 440 along with other unchanged micro-services, and secondary services may be used or generated as the test model.

Referring now to FIG. 5, an example configuration manager 500 including model configuration table 502 is illustrated. A micro-service may include a configuration table 500 defining configuration settings for configuration parameters (sub-payloads) that could be used to configure the micro-service for testing and/or deployment. Configuration table 500 may include configuration parameters 510, properties 520, and values 530. Each configuration parameter 511-513 is associated with a corresponding property 521-523 and a property value 531-533 for configuring a feature of the micro-service. For example, configuration parameter 511 (i.e., PT101) is associated with property 521 (i.e., pt.primary) and property value 531 (i.e., 101) indicating that a received confirmation parameter 511 requires the property 521's value to be changed from it's global value to the property value 531.

Further configuration manager 500 may also include a global parameters table 540 defining the global (i.e., default, current) values 560 of each property 550 of the sub-service. For example, properties 551-553 may be associated with their corresponding global values 561-563 in the global parameters table 540. For example property 551 (i.e., pt.primary) may have the global value set as value 561 (i.e., 100).

When a sub-payload "PT101" is received at the micro-service, the micro-service may query the model configuration table 502 to match the sub-payload "PT101" with the configuration parameter 511. Upon matching, the micro-service may determine that the sub-payload requires that the property 521 (i.e., pt.primary) have a property value 531 (i.e., 101). Next, the micro-service may query the global parameters table 540 to determine the global value 561 (i.e., 100) of the property 551 that matches the property 521. If the global value 561 does not match the property value 531 required for the experiment (e.g., test), micro-service may switch the value of the property 551 from its global value 561 to the property value 531 as indicated in the model configuration table 502.

Figure 6:
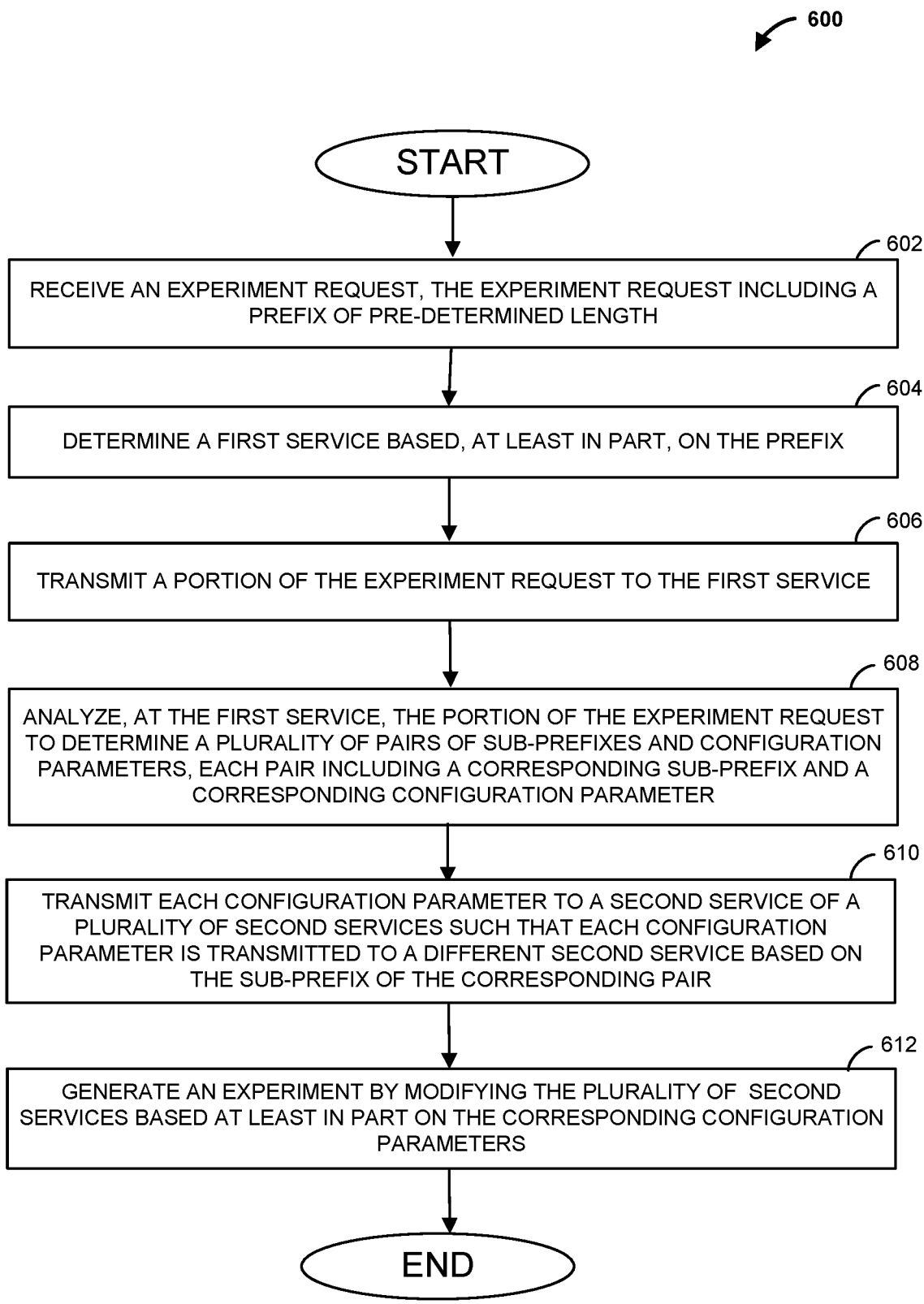
FIG. 6 is a flowchart of an example method that can be carried out by the model testing system of FIG. 1 in accordance with some embodiments.

Referring now to FIG. 6, an example method 600 for generating an experiment is illustrated. The method begins at step 602 when the model testing system 100 receives an experiment request. The experiment request including a prefix of pre-determined length. For example, test generation computing device 102 may receive an experiment request 302 including a prefix or pre-determined length (e.g., service prefix).

The test generation computing device 102 may determine a first service based, at least in part, on the prefix at step 604. For example, the front end service may determine a first service (e.g., secondary service 304) based on the prefix (e.g., service prefix). At step 606, a portion of the experiment request is transmitted to a first service. For example, the front end service may transmit a portion of the experiment (e.g., first payload) to the secondary service 304 based on the prefix (e.g., service prefix).

At step 608, the test generation computing device 102 may analyze, at the first service, the portion of the experiment request to determine a plurality of pairs of sub-prefixes and configuration parameters. Each pair includes a corresponding sub-prefix and a corresponding configuration parameter. For example, secondary service 304 may analyze the portion of the experiment request (e.g., first payload) to determine one or more sub-prefix and configuration parameter pairs (e.g., sub-prefix and sub-payload pairs).

At step 610, the method 600 includes each configuration parameter to a second service of a plurality of second services such that each configuration parameter is transmitted to a different second service based on the sub-prefix of the corresponding pair. For example, the secondary service 304 may transmit the configuration parameters corresponding second services (e.g., micro-services) based on the associated sub-pre At step 612, an experiment is generated by modifying the plurality of second services based at least in part on the corresponding configuration parameters. For example, the test model 314 may then be generated based at least in part on the configured micro-services, the micro-services configured based on the corresponding configuration parameters.

Figure 7:
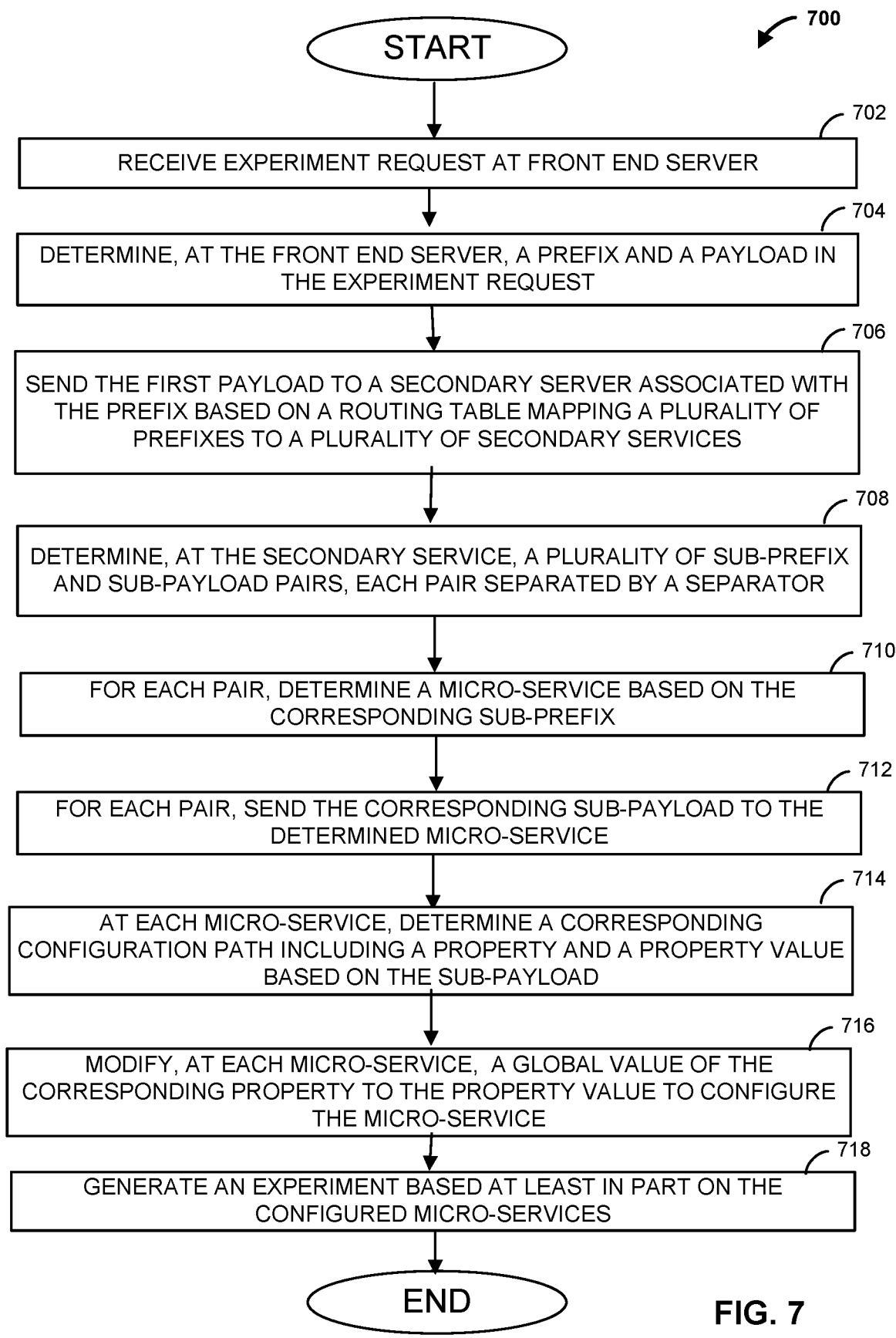
FIG. 7 is a flowchart of another example method that can be carried out by the model testing system of FIG. 1 in accordance with some embodiments.

FIG. 7 illustrates another example method 700 of the present disclosure. The method begins at step 702, when an experiment request is received at a front end server. For example, test generation computing device 102 may receive an experiment request 302 at the front end server. At step 704, at the front end server, a prefix and a payload are determined in the experiment request. For example, test generation computing device 102 may parse the experiment request 302 to determine a prefix or pre-determined length (e.g., service prefix) and a remaining portion of the experiment request (e.g., first payload) form a user.

At step 706, the first payload is sent to a secondary server associated with the prefix based on a routing table mapping a plurality of prefixes to a plurality of secondary services. For example, the front end service may transmit the first payload to the secondary service 304 based on the prefix (e.g., service prefix) matching a prefix in a routing table that maps a plurality of service prefixes to a plurality of secondary services associated with the front end service.

At step 708, at the secondary service, a plurality of sub-prefix and sub-payload pairs are determined such that each pair separated by a separator. For example, secondary service 304 may analyze the first payload to determine one or more sub-prefix and configuration parameter pairs (e.g., sub-prefix and sub-payload pairs), where each pair is separated from the next pair using a separator.

At step 710, for each pair, a micro-service is determined based on the corresponding sub-prefix. For example, secondary service 304 may consult a routing table associating all sub-prefixes, associated with the secondary service, with corresponding micro-services to determine a micro-service (e.g., micro-service 306A, micro-service 306B) for each pair based on the corresponding sub-prefix.

At step 712, for each pair, the corresponding sub-payload is sent to the determined micro-service. For example, Secondary service 304 may redirect the sub-payloads to their corresponding micro-services, first micro-service 306A and second micro-service 306B for configuration.

At step 714, at each micro-service, a corresponding configuration path including a property and a property value is determined based on the sub-payload. For example, the sub-payload may be used as a configuration parameter (e.g., configuration name, configuration key, experiment key) at the corresponding micro-service. Micro-service 306A may use a configuration manager 308 to match the sub-payload to a configuration triple pair, associating the configuration parameter to a property and a property value for that property in a configuration table.

At step 716, at each micro-service, a global value of the corresponding property is modified to the property value to configure the micro-service. For example, the property value from step 308B may be used to configure the property (e.g., feature) at step 310 by switching a global value (e.g., current value, default value) of the property to the determined property value at step 310.

At step 718, an experiment is generated based at least in part on the configured micro-services. For example, test model 314 may then be generated based at least in part on the configured micro-services 306A and 306B. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising: a computing device comprising a user interface, a non-transitory computer readable medium storing instructions, and at least one processor communicatively coupled to the user interface and the non-transitory computer readable medium, wherein the at least one processor is configured to execute the instructions to:
- receive an experiment request, the experiment request including a prefix of a pre-determined length;
- determine a first service based, at least in part, on the prefix;
- transmit a portion of the experiment request to the first service;
- analyze, at the first service, the portion of the experiment request to determine a plurality of pairs of sub-prefixes and configuration parameters, each pair including a corresponding sub-prefix and a corresponding configuration parameter;
- transmit each of the configuration parameters to a second service of a plurality of second services such that each of the configuration parameters is included in a respective pair of the plurality of pairs and is transmitted to a different second service based on a respective corresponding sub-prefix included in the respective pair, wherein each of the configuration parameters is associated with a configuration property and a value;
- determine the configuration property and the value based at least in part on a model configuration table and a respective corresponding configuration parameter included in the respective pair; and
- generate an experiment by modifying the plurality of second services based at least in part on the configuration parameters.

2. The system of claim 1, wherein modifying the plurality of second services includes modifying the configuration property based on the value.

3. The system of claim 2, wherein the modifying the configuration property based on the value includes changing a global value of the configuration property to the value.

4. The system of claim 3, wherein the global value is one of a default value or a pre-experiment value of the configuration property.

5. The system of claim 1, wherein the computing device is further configured to:
- determine a corresponding configuration property and a corresponding value based at least in part on a configuration path corresponding to each of the configuration parameters; and
- modify a corresponding second service based at least in part on the corresponding configuration property and the corresponding value.

6. The system of claim 1, wherein the computing device is further configured to determine the plurality of second services by comparing corresponding one or more sub-prefixes to a routing table associated with the first service.

7. The system of claim 6, wherein the routing table includes a plurality of suffixes, each suffix associated with a service, and a service location.

8. A method comprising:
- receiving an experiment request, the experiment request including a prefix of a pre-determined length;
- determining a first service based, at least in part, on the prefix;
- transmitting a portion of the experiment request to the first service;
- analyzing, at the first service, the portion of the experiment request to determine a plurality of pairs of sub-prefixes and configuration parameters, each pair including a corresponding sub-prefix and a corresponding configuration parameter;
- transmitting each of the configuration parameters to a second service of a plurality of second services such that each of the configuration parameters is included in a respective pair of the plurality of pairs and is transmitted to a different second service based on a respective corresponding sub-prefix included in the respective pair, wherein each of the configuration parameters is associated with a configuration property and a value;
- determining the configuration property and the value based at least in part on a model configuration table and a respective corresponding configuration parameter included in the respective pair; and
- generating an experiment by modifying the plurality of second services based at least in part on the configuration parameters.

9. The method of claim 8, wherein modifying the plurality of second services includes modifying the configuration property based on the value.

10. The method of claim 9, wherein the modifying the configuration property based on the value includes changing a global value of the configuration property to the value.

11. The method of claim 10, wherein the global value is one of a default value or a pre-experiment value of the configuration property.

12. The method of claim 8, the method further comprising:
- determining a corresponding configuration property and a corresponding value based at least in part on a configuration path corresponding to each of the configuration parameters; and
- modifying a corresponding second service based at least in part on the corresponding configuration property and the corresponding value.

13. The method of claim 8, the method further comprising determining the plurality of second services by comparing corresponding one or more sub-prefixes to a routing table associated with the first service.

14. The method of claim 13, wherein the routing table includes a plurality of suffixes, each suffix associated with a service, and a service location.

15. A non-transitory computer readable medium having instructions stored thereon, wherein the instructions, when executed by at least one processor, cause a computing device to perform operations comprising:
- receiving an experiment request, the experiment request including a prefix of a pre-determined length;
- determining a first service based, at least in part, on the prefix;
- transmitting a portion of the experiment request to the first service;
- analyzing, at the first service, the portion of the experiment request to determine a plurality of pairs of sub-prefixes and configuration parameters, each pair including a corresponding sub-prefix and a corresponding configuration parameter;
- transmitting each of the configuration parameters to a second service of a plurality of second services such that each of the configuration parameters is included in a respective pair of the plurality of pairs and is transmitted to a different second service based on a respective corresponding sub-prefix included in the respective pair, wherein each of the configuration parameters is associated with a configuration property and a value;
- determining the configuration property and the value based at least in part on a model configuration table and a respective corresponding configuration parameter included in the respective pair; and generating an experiment by modifying the plurality of second services based at least in part on the configuration parameters.

16. The non-transitory computer readable medium of claim 15, wherein modifying the plurality of second services includes modifying the configuration property based on the value.

17. The non-transitory computer readable medium of claim 15, the instructions, when executed by the at least one processor further cause the computing device to perform operations that include determining the plurality of second services by comparing corresponding one or more sub-prefixes to a routing table associated with the first service.

18. The non-transitory computer readable medium of claim 17, wherein the routing table includes a plurality of suffixes, each suffix associated with a service, and a service location.

\* \* \* \* \*